(12) United States Patent
Garg et al.

(10) Patent No.: US 7,555,773 B2
(45) Date of Patent: Jun. 30, 2009

(54) METHODS AND APPARATUS TO PROVIDE A PLATFORM-LEVEL NETWORK SECURITY FRAMEWORK

(75) Inventors: Ajay Garg, Portland, OR (US); Pankaj Parmar, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 612 days.

(21) Appl. No.: 10/726,436

(22) Filed: Dec. 3, 2003

(65) Prior Publication Data
US 2005/0125691 A1    Jun. 9, 2005

(51) Int. Cl.
*H04L 12/22* (2006.01)
*H04L 29/08* (2006.01)

(52) U.S. Cl. .......................... 726/13; 726/15
(58) Field of Classification Search .............. 726/13–15
See application file for complete search history.

(56) References Cited

U.S. PATENT DOCUMENTS 5,748,980 A * 5/1998 Lipe et al. .................. 710/8
7,051,367 B1 * 5/2006 Krishnaswamy et al. ...... 726/22

OTHER PUBLICATIONS

Doran, Mark. "Extensible Firmware Interface:booting the new generation of Intel Architecture platforms". Intel Labs Sep. 1, 1999.*
Kinney, Michael, "Solving BIOS Boot Issues with EFI," Intel Developer Update Magazine, Sep. 2000 (6 pages).
"Extensible Firmware Interface" INTEL Corporation Website, http://developer.intel.com/technology/efi/, printed on Oct. 26, 2007.

* cited by examiner

*Primary Examiner*—Gilberto Barron, Jr.
*Assistant Examiner*—Venkat Perungavoor
(74) *Attorney, Agent, or Firm*—Hanley, Flight & Zimmerman, LLC

(57) ABSTRACT

Methods and apparatus to provide a platform-level network security framework are described herein. In an example method, a packet associated with a processor system is identified. A platform-level network security protocol associated with an extensible firmware interface is identified. Based on the platform-level network security protocol, the packet is identified with a network security condition.

16 Claims, 5 Drawing Sheets

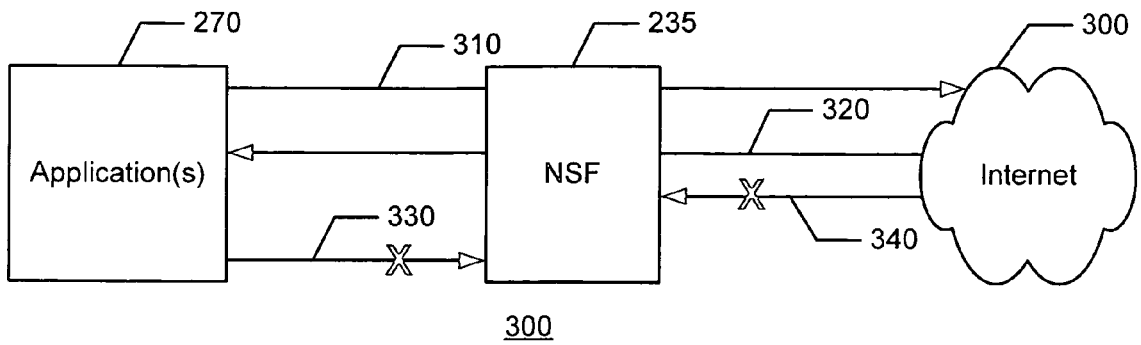

FIG. 3

```
// GUID definition
#define EFI_NETWORK_SECURITY_FIREWALL {DEADBEEF-XXXX-YYY ... ....}
// Revision Number
#define EFI_NETWORK_SECURITY_FIREWALL_REVISION 0x00010000
                                                              ┌────────── 422
                                                             ╱
typedef struct _EFI_NETWORK_SECURITY_FIREWALL{
         UNIT64 Revision;
         EFI_NETWORK_SECURITY_FIREWALL_INIT          FwInit;
         EFI_NETWORK_SECURITY_FIREWALL_DEINIT        FwDeInit;
         EFI_NETWORK_SECURITY_FIREWALL_CHECK_PKT     FwChkPkt;
         EFI_NETWORK_SECURITY_FIREWALL_ADD_RULE      FwAddRule;
  432 <  EFI_NETWORK_SECURITY_FIREWALL_DELETE_RULE   FwDelRule;
         EFI_NETWORK_SECURITY_FIREWALL_XXXXXXX       FwXxxxxx;
         EFI_NETWORK_SECURITY_FIREWALL_YYYYYYY       FwYyyyyy;
         ... ... ....,
         EFI_NETWORK_SECURITY_FIREWALL_CONFIG_DATA   ConfigData,
         } EFI_NETWORK_SECURITY_FIREWALL;

typedef struct _EFI_NETWORK_SECURITY_FIREWALL_CONFIG_DATA {
         UINT32 Rule ID;
         UINT32 SourceIPAddress;
         UINT32 DestinationIPAddress;

... ... .....
         } EFI_NETWORK_SECURITY_FIREWALL_CONFIG_DATA;
// define function pointers
EFI_STATUS
(EFIAPI * EFI_NETWORK_FIREWALL_INIT) (
         IN EFI_NETWORK_SECURITY_FIREWALL_CONFIG_DATA InitData
         );

EFI_STATUS
(EFIAPI * EFI_NETWORK_FIREWALL_INIT) (
         VOID
         );
```

METHODS AND APPARATUS TO PROVIDE A PLATFORM-LEVEL NETWORK SECURITY FRAMEWORK

TECHNICAL FIELD

The present disclosure relates generally to network security, and more particularly, to methods and apparatus to provide a platform-level network security framework.

BACKGROUND

To prevent outsiders (e.g., "hackers") from accessing a network entity, firewalls are installed on the network entity or somewhere between the hackers and the network entity. A firewall is a program or a set of related programs typically located at a network server or network entities that protect the resources of a network entity from other network entities by controlling communication between the network entities. In one particular example, the firewall may serve as a "fence" between the network entity and the Internet. That is, the firewall filters network traffic by allowing safe network packets to pass while restricting or rejecting unsafe network packets. In particular, the firewall examines each network packet to determine whether to forward the network packet to its intended destination or to stop the network packet from proceeding. For example, the firewall may compare the source address (e.g., Internet Protocol (IP) address or domain name) of the network packet to an access list defined by a security policy of the network.

Known firewalls are often part of the main operating system (OS) in the network (i.e., OS dependent). Typically, network security is provided by a set of protocols embedded in an OS kernel and/or executed as independent applications. If the main OS is exploited and breached by a hacker and/or a virus, the lines of code implementing the firewalls may be vulnerable and exposed. Thus, using currently-available OS-based firewalls, a network may be left unprotected.

BRIEF DESCRIPTION OF THE DRAWINGS

FIG. 3 is a block diagram representation of an example firewall that may be implemented by the example platform-level network security system of FIG. 2.

FIG. 4 is a code representation of an example platform-level network security framework that may be used to implement the example platform-level network security system of FIG. 2.

DETAILED DESCRIPTION

Although the following discloses example systems including, among other components, software or firmware executed on hardware, it should be noted that such systems are merely illustrative and should not be considered as limiting. For example, it is contemplated that any or all of the disclosed hardware, software, and/or firmware components could be embodied exclusively in hardware, exclusively in software, exclusively in firmware or in some combination of hardware, software, and/or firmware.

Figure 1:
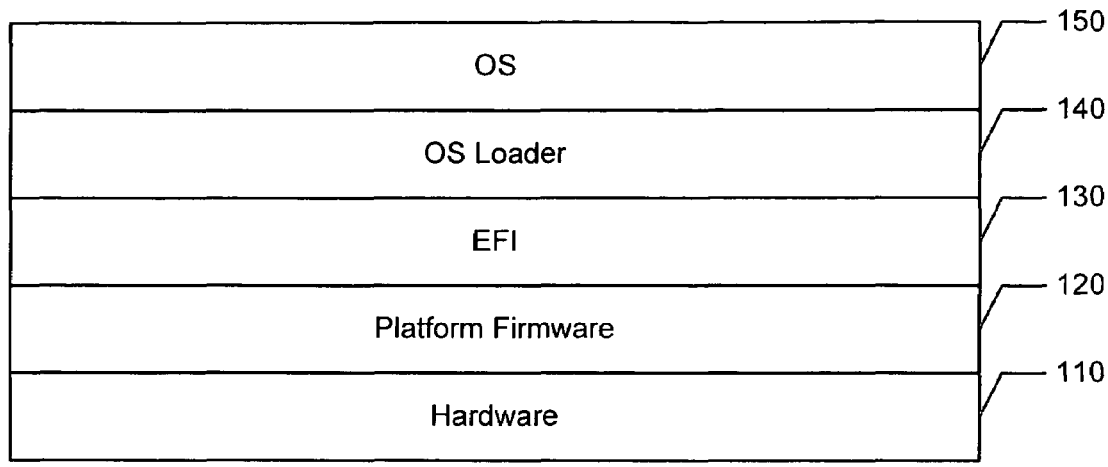
FIG. 1 is a block diagram representation of an example architecture of a platform-level network security system.

In the example of FIG. 1, an illustrated architecture 100 of a network system (e.g., the platform-level network security system 200 of FIG. 2) includes hardware 110, a platform firmware or a basic input/output system (BIOS) 120, an extensible firmware interface (EFI) 130, an operating system (OS) loader 140, and an OS 150. Persons of ordinary skill in the art will readily recognize that hardware 110 may include any physical aspect of the network system such as a network interface (e.g., the network interface 210 of FIG. 2), a processor, and a main memory (e.g., the processor 1020 and the main memory 1030 of FIG. 7). Hardware 110 also includes interface circuit(s), input device(s), output device(s), and/or mass storage device(s). The platform firmware (e.g., BIOS) 120 may be implemented as software, firmware, or machine readable instructions to boot up (i.e., start up) the network system in a conventional manner.

To boot the OS 150 (e.g., Microsoft Windows®, UNIX, or Linux) and to run pre-boot applications, the platform firmware 120 manages data flow between the OS loader 140 and the hardware 110 of the network traffic system via the EFI 130. To assist the platform firmware 120 in managing data flow, the EFI 130 is used to define an interface between the OS 150 and the platform firmware 120. As described in detail below, the EFI 130 includes data tables containing platform-related information. The EFI 130 also includes boot and runtime service calls that are available to the OS 150. Accordingly, the EFI 130 provides a standard environment for booting the OS 150 and running pre-boot applications. Additional information pertinent to the EFI 130 is available at http://developer.intel.com/technology/efi. Alternatively, the platform firmware 120 may communicate directly with the OS 150 in a conventional manner without the EFI 130.

Figure 2:
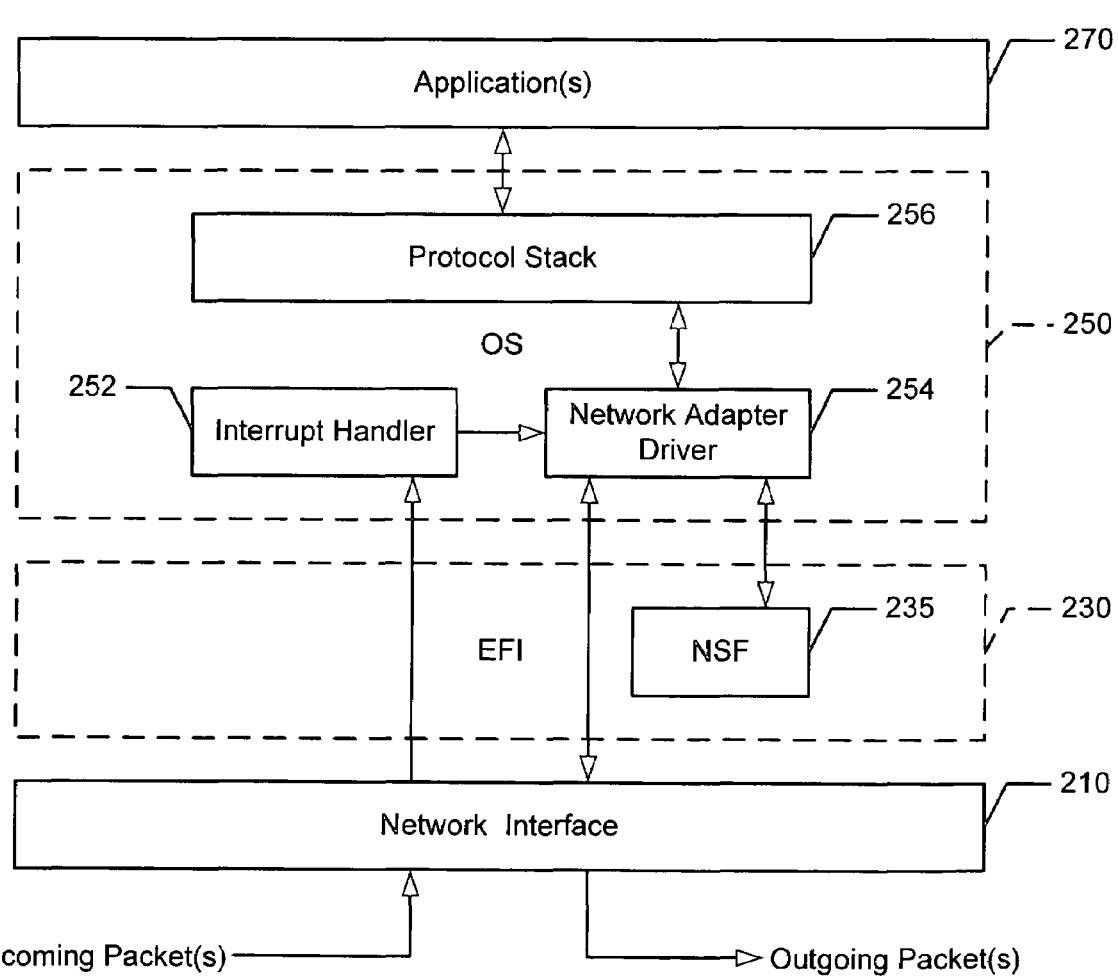
FIG. 2 is a block diagram representation of an example platform-level network security system configured in accordance with the teachings of the invention.

In the example of FIG. 2, the illustrated platform-level network security system 200 includes a network interface 210, an EFI 230, an OS 250, and one or more applications 270. The network interface 210 is coupled to the OS 250 to facilitate exchange of data with external computers (not shown) via the platform-level network security system 200. That is, the network interface 210 receives incoming network packets and to transmit outgoing network packets to and from the platform-level network security system 200. In one particular example, the network interface 210 may be a network interface card (NIC) as persons of ordinary skill in the art will readily recognize. Further, the network interface 210 communicates with the external computers via any type of network connection such as an Ethernet connection, a digital subscriber line (DSL), a telephone line, a cellular telephone system, a coaxial cable, etc.

The EFI 230 defines one or more protocols to provide support for the OS 250 such as, for example, console support, bootable image support, peripheral component interconnect (PCI) bus support, small computer system interface (SCSI) bus support, universal serial bus (USB) support, network support, debugger support, etc. In particular, the EFI 230 includes a network security framework (NSF) 235, which is implemented by one or more protocols to provide network security support for the OS 250. The NSF 235 inspects incoming and/or outgoing network packets on a platform level based on a defined security policy. For example, the NSF 235 may be defined to provide a firewall (e.g., the firewall 300 of FIG. 3), a virtual private network (VPN), an Internet Protocol Security (IPSEC) framework, etc. during a pre-boot environment.

In the illustrated example of FIG. 3, the NSF 235 controls network traffic between the applications 270 and the Internet 300 based on the defined security policy of the platform-level network security system 200. As used herein the term "application" refers to one or more methods, functions, routines, or subroutines for manipulating data, and the term "Internet" refers to a worldwide system of computer networks (i.e., a network of networks). In particular, the NSF 235 may allow network traffic from 310 and grant access 320 to the applications 270. On the other hand, the NSF 235 may prevent network traffic from 330 and deny access 340 to the applications 270 as well.

Referring back to FIG. 2, the OS 250 includes an interrupt handler 252, a network interface driver 254, and a protocol stack 256 to operate the platform-level network security system 200. The OS 250 may also include other driver(s) to operate different components of the platform-level network security system 200 (e.g., a mouse, a keyboard, a monitor, a printer, etc.). The interrupt handler 252 receives an interrupt request (IRQ) from the network interface 210 in response to receipt of an incoming network packet and/or an outgoing network packet by the network interface 210. The network interface driver 254 enables a runtime implementation of the NSF 235 to identify a network security condition with incoming network packets and/or outgoing network packets retrieved from the network interface 210. For example, the network interface driver 254 may be implemented by a single runtime EFI driver to execute the NSF 235.

Alternatively, the network interface driver 254 may be implemented by a plurality of runtime EFI drivers with each runtime EFI driver programmed to execute a particular NSF-specific protocol of the NSF 235. As an example described above, the network interface 210 may be an NIC. Accordingly, the network interface driver 254 may be an NIC driver to support the NIC. The network interface driver 254 is operatively coupled to the protocol stack 256 (i.e., network access protocol(s)). In one particular example, the protocol stack 256 may be the well-known Transmission Control Protocol/Internet Protocol (TCP/IP). Persons of ordinary skill in the art will readily recognize that the TCP/IP communicates between protocols from different platforms such as Windows and UNIX and serves as the protocol of the Internet. In another example, the protocol stack 256 may be based on the Internet Packet Exchange (IPX) protocol. In any event, the protocol stack 256 serves as an interface between the OS 250 and the one or more applications 270.

In general, the NIC 210 initially receives a network packet (e.g., an incoming network packet and/or an outgoing network packet). For example, the platform-level network security system 200 may receive an incoming network packet from a server hosting a particular web site via the Internet. In another example, the platform-level network security system 200 may transmit an outgoing network packet via the Internet. In response to receipt of a network packet, the network interface 210 generates an IRQ to the interrupt handler 252 of the OS 250. Accordingly, the interrupt handler 252 notifies the network interface driver 254 that the network interface 210 has a network packet. The network interface driver 254 retrieves the network packet from the network interface 210. Further, the network interface driver 254 calls an application program interface (API) of the NSF 235 to identify a network security condition associated with the retrieved network packet. For example, the API of the NSF 235 may be implemented by the NSF code 400 shown in FIG. 4 and described in detail below.

In the illustrated example of FIG. 4, the NSF code 400 includes one or more global unique identifiers (GUID) 422 and one or more data pointers (i.e., void pointers) 432. Each of the data pointers 432 identifies information associated with one of the GUIDs 422, including other data and/or function pointers. In one particular example, the GUID 422 of EFI_NETWORK_SECURITY_FIREWALL includes the one or more data pointers 432 containing firewall functions such as initialize firewall (FwInit), deinitialize firewall (FwDeInit), check network packet (FwChkPkt), add a rule (FwAddRule), delete a rule (FwDelRule), and other suitable firewall functions and/or rules to comply with the defined security policy of the platform-level network security system 200.

Figure 5:
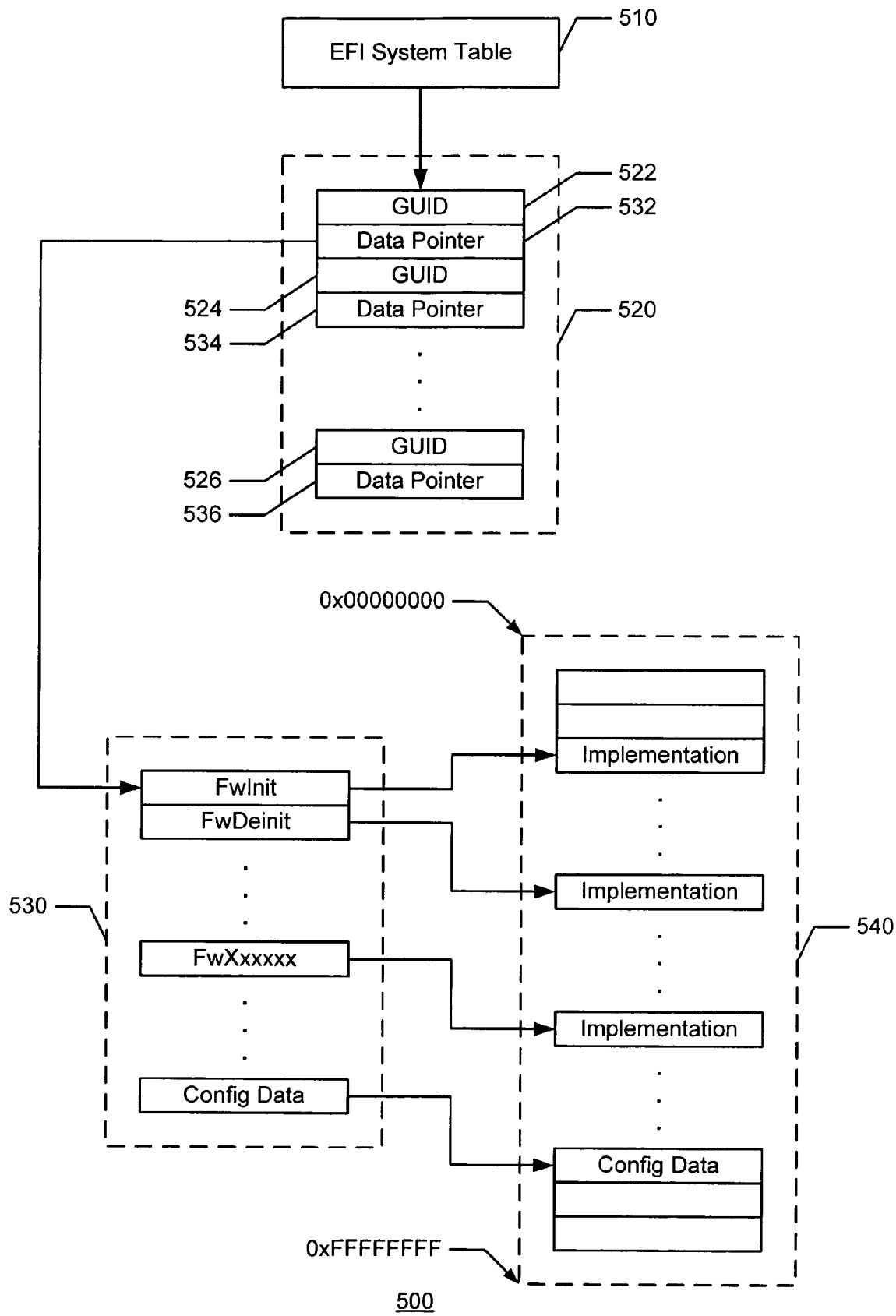
FIG. 5 is a block diagram representation of example configuration table entries that may be used to implement the example platform-level network security system of FIG. 2.

Referring to FIGS. 4 and 5, the EFI system table 510 of the EFI 530 includes pointers to runtime and boot services tables. In particular, the EFI system table 510 includes a pointer to a configuration table 520, which is an array of elements in which each element has one or more GUIDs, generally shown as 522, 524, and 526, and one or more data pointers, generally shown as 532, 534, and 536. If the one or more data pointers 532, 534, and 536 identify an instance of the protocol structure which contains pointers, the implementation and data are available to the OS 250. The OS 250 relocates one or more protocols of the NSF 235 to a virtual address space 540 of the OS 250. In one particular example, the GUID 422 of EFI_NETWORK_SECURITY_FIREWALL in the NSF code 400 points to the data structure 530 containing the one or more data pointers 432 associated with the GUID 422 (i.e., FwInit, FwDeInit, FwChkPkt, FwAddRule, FwDelRule, etc.). Accordingly, the NSF 235 stores the one or more data pointers 432 at the virtual address space 540 for the OS 250 to execute, thereby enabling the OS 250 to implement the example firewall functions described herein.

While the platform-level network security system 200 is described above to implement a firewall on the platform level, the platform-level network security system 200 may also provide other types of network security on the platform level including a VPN framework and/or an IPSEC framework.

Figure 6:
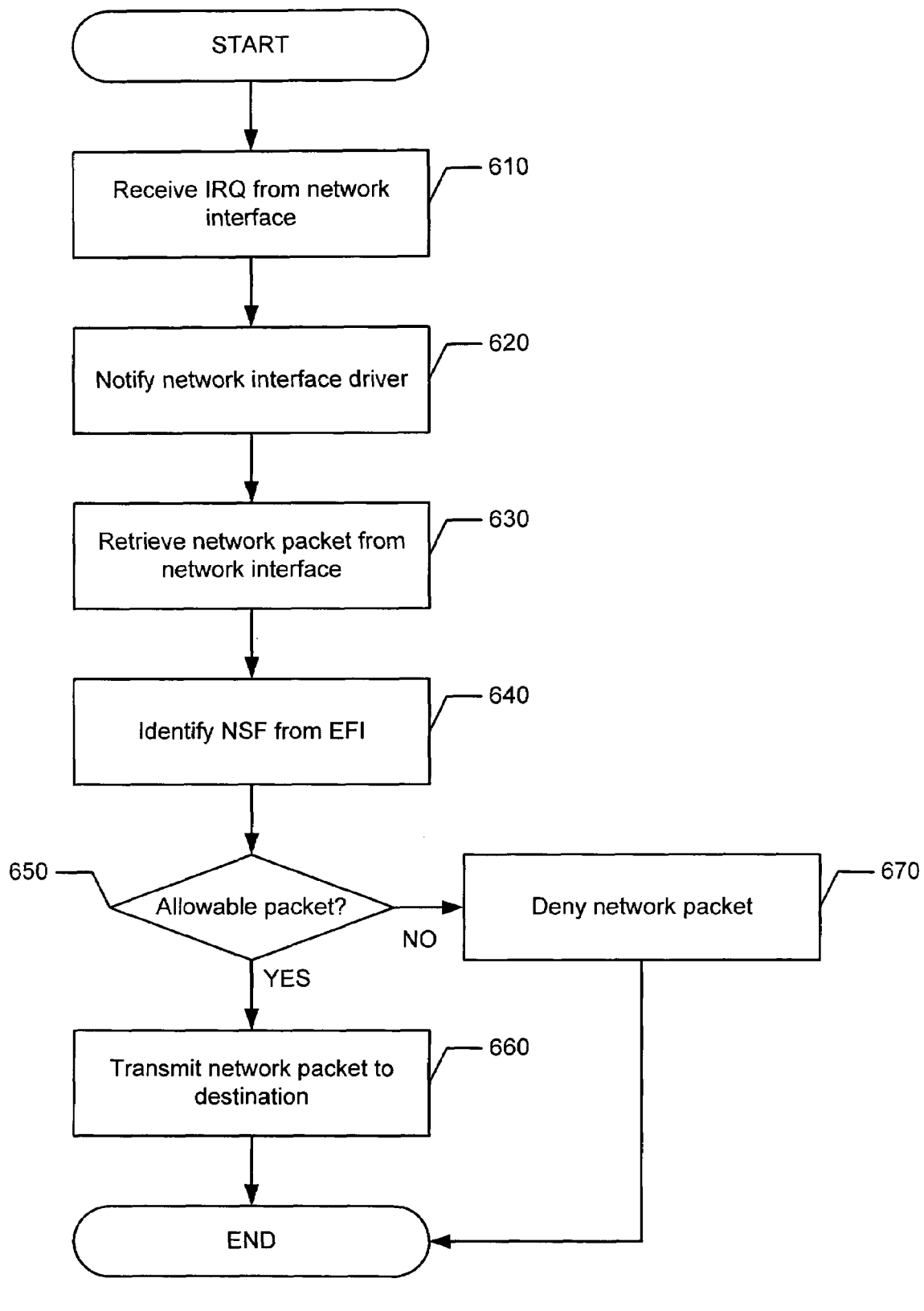
FIG. 6 is a flow diagram representation of example machine readable instructions that may be executed to implement the example platform-level network security system of FIG. 2

A flow diagram 600 representing machine readable instructions that may be executed by a processor to provide a platform-level NSF is illustrated in FIG. 6. Persons of ordinary skill in the art will appreciate that the instructions may be implemented in any of many different ways utilizing any of many different programming codes stored on any of many machine readable mediums such as a volatile or nonvolatile memory or other mass storage device (e.g., a floppy disk, a CD, and a DVD). For example, the machine readable instructions may be embodied in a machine readable medium such as an erasable programmable read only memory (EPROM), a read only memory (ROM), a random access memory (RAM), a magnetic media, an optical media, and/or any other suitable type of medium. Alternatively, the machine readable instructions may be embodied in a programmable gate array and/or an application specific integrated circuit (ASIC). Further, although a particular order of actions is illustrated in FIG. 6, persons of ordinary skill in the art will appreciate that these actions can be performed in other temporal sequences. Again, the flow diagram 600 is merely provided as an example of one way to provide a platform-level NSF.

The flow diagram 600 begins with the interrupt handler 252 of the OS 250 receiving an IRQ from the network interface 210 (block 610). In particular, the IRQ indicates receipt of an incoming network packet by the network interface 210 to the OS 250. The interrupt handler 252 notifies the network interface driver 254 of the incoming network packet and instructs the network interface driver 254 to retrieve the incoming network packet from the network interface 210 (block 620). Accordingly, the network interface driver 254 retrieves the incoming network packet from the network interface 210 (block 630). Alternatively, the network interface driver 254 may automatically receive and identify the incoming network packet (i.e., "push" scheme from the network interface 210) without retrieving the incoming network packet (i.e., "pull" scheme from the network interface 210). That is, the network interface driver 254 may receive the incoming network packet without being notified by the interrupt handler 252.

To identify a security condition associated with the incoming network packet, the network interface driver 254 identifies the NSF 235 (block 640). Based on the NSF 235, the network interface driver 254 determines whether the incoming network packet is acceptable by the OS 250 (block 650). The NSF 235 filters the incoming network packet based on a security policy of the platform-level network security system 200. For example, the security policy may be defined to block network traffic to and from a particular IP address or domain name. If the NSF 235 permits the incoming network packet to access the platform-level network security system 200, the network interface driver 254 sends the incoming network packet to the protocol stack 256 (block 660). For example, the NSF 235 may enable one or more TCP/IP ports of the protocol stack 256 to permit network traffic to the applications 270. Otherwise, if the NSF 235 denies the incoming network packet access the platform-level network security system 200, the network interface driver 254 stops the incoming network packet (i.e., prevents the incoming network packet from being sent to the protocol stack 256) (block 670). Following the example described above, the NSF 235 may disable one or more TCP/IP ports of the protocol stack 256 to prevent or block network traffic to the applications 270. As a result, the platform-level network security system 200 may be used to provide OS-independent network security support to any platform.

While the examples of the methods and apparatus disclosed herein are applied to incoming network packets, persons of ordinary skill in the art will appreciate that the teachings of the disclosure may be applied to outgoing network packets as well. For example, the OS 250 may send an outgoing network packet to the network interface driver 254 for processing by the NSF 235. Further, the methods and apparatus disclosed herein are well suited for network packets. However, persons of ordinary skill in the art will appreciate that the teachings of the disclosure may be applied to other data packets.

Figure 7:
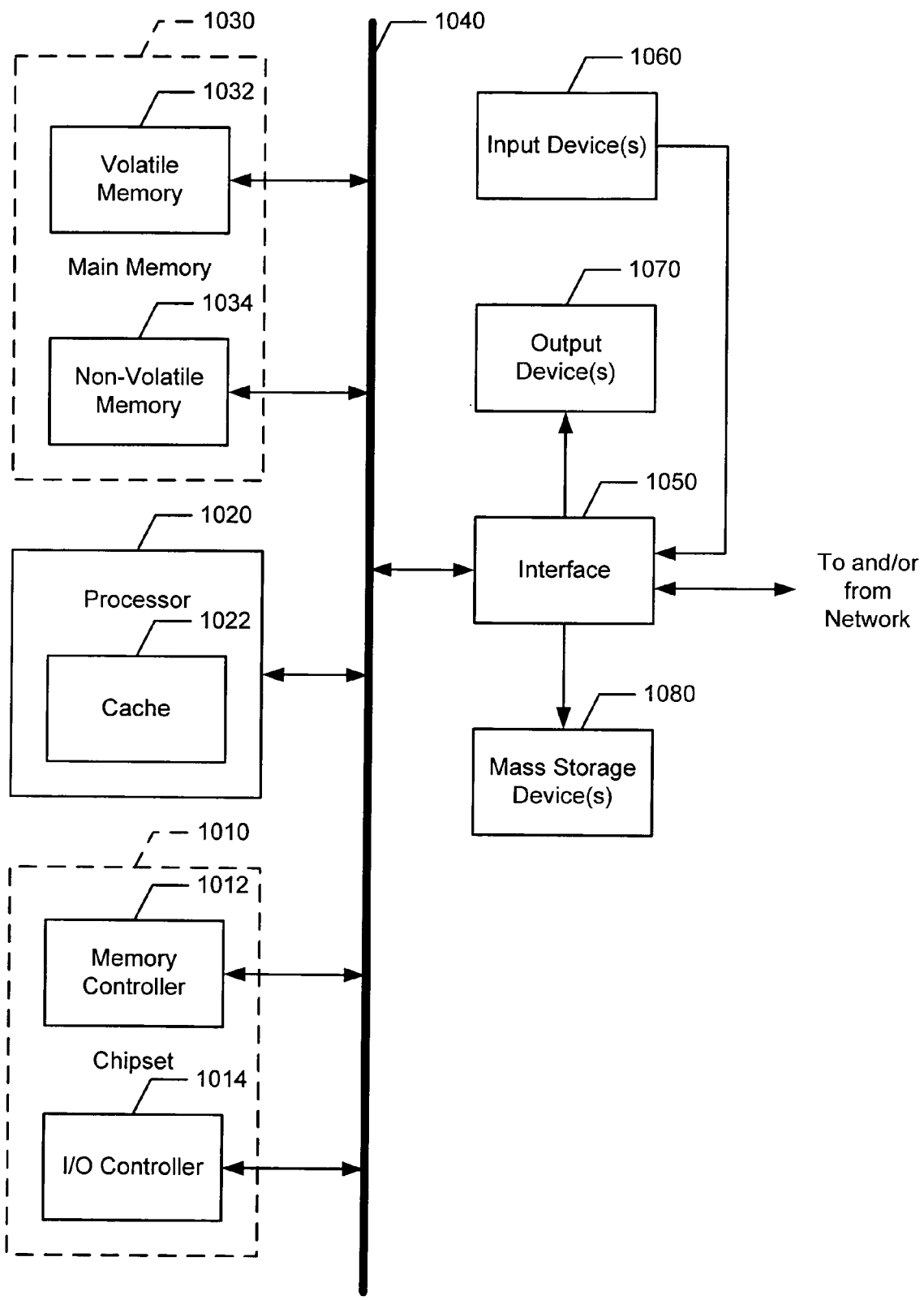
FIG. 7 is a block diagram representation of an example processor system that may be used to implement the example platform-level network security system of FIG. 2.

FIG. 7 is a block diagram of an example processor system 1000 adapted to implement the methods and apparatus disclosed herein. The processor system 1000 may be a desktop computer, a laptop computer, a notebook computer, a personal digital assistant (PDA), a server, an Internet appliance or any other type of computing device.

The processor system 1000 illustrated in FIG. 7 includes a chipset 1010, which includes a memory controller 1012 and an input/output (I/O) controller 1014. As is well known, a chipset typically provides memory and I/O management functions, as well as a plurality of general purpose and/or special purpose registers, timers, etc. that are accessible or used by a processor 1020. The processor 1020 is implemented using one or more processors. For example, the processor 1020 may be implemented using one or more of the Intel® Pentium® technology, the Intel® Itanium® technology, Intel® Centrino™ technology, and/or the Intel® XScale® technology. In the alternative, other processors or families of processors may be used to implement the processor 1020. The processor 1020 includes a cache 1022, which may be implemented using a first-level unified cache (L1), a second-level unified cache (L2), a third-level unified cache (L3), and/or any other suitable structures to store data as persons of ordinary skill in the art will readily recognize.

As is conventional, the memory controller 1012 performs functions that enable the processor 1020 to access and communicate with a main memory 1030 including a volatile memory 1032 and a non-volatile memory 1034 via a bus 1040. The volatile memory 132 may be implemented by Synchronous Dynamic Random Access Memory (SDRAM), Dynamic Random Access Memory (DRAM), RAMBUS Dynamic Random Access Memory (RDRAM), and/or any other type of random access memory device. The non-volatile memory 1034 may be implemented using flash memory, Read Only Memory (ROM), Electrically Erasable Programmable Read Only Memory (EEPROM), and/or any other desired type of memory device.

The processor system 1000 also includes an interface circuit 1050 that is coupled to the bus 1040. The interface circuit 1050 may be implemented using any type of well known interface standard such as an Ethernet interface, a universal serial bus (USB), a third generation input/output interface (3GIO) interface, and/or any other suitable type of interface.

One or more input devices 1060 are connected to the interface circuit 1050. The input device(s) 1060 permit a user to enter data and commands into the processor 1020. For example, the input device(s) 1060 may be implemented by a keyboard, a mouse, a touch-sensitive display, a track pad, a track ball, an isopoint, and/or a voice recognition system.

One or more output devices 1070 are also connected to the interface circuit 1050. For example, the output device(s) 1070 may be implemented by display devices (e.g., a light emitting display (LED), a liquid crystal display (LCD), a cathode ray tube (CRT) display, a printer and/or speakers). The interface circuit 1050, thus, typically includes, among other things, a graphics driver card.

The processor system 1000 also includes one or more mass storage devices 1080 stores software and data. Examples of such mass storage device(s) 1080 include floppy disks and drives, hard disk drives, compact disks and drives, and digital versatile disks (DVD) and drives.

The interface circuit 1050 also includes a communication device such as a modem or a network interface card to facilitate exchange of data with external computers via a network. The communication link between the processor system 1000 and the network may be any type of network connection such as an Ethernet connection, a digital subscriber line (DSL), a telephone line, a cellular telephone system, a coaxial cable, etc.

Access to the input device(s) 1060, the output device(s) 1070, the mass storage device(s) 1080 and/or the network is typically controlled by the I/O controller 1014 in a conventional manner. In particular, the I/O controller 1014 performs functions that enable the processor 1020 to communicate with the input device(s) 1060, the output device(s) 1070, the mass storage device(s) 1080 and/or the network via the bus 1040 and the interface circuit 1050.

While the components shown in FIG. 7 are depicted as separate blocks within the processor system 1000, the functions performed by some of these blocks may be integrated within a single semiconductor circuit or may be implemented using two or more separate integrated circuits. For example, although the memory controller 1012 and the I/O controller 1014 are depicted as separate blocks within the chipset 1010, persons of ordinary skill in the art will readily appreciate that the memory controller 1012 and the I/O controller 1014 may be integrated within a single semiconductor circuit.

Although certain example methods, apparatus, and articles of manufacture have been described herein, the scope of coverage of this patent is not limited thereto. On the contrary, this patent covers all methods, apparatus, and articles of manufacture fairly falling within the scope of the appended claims either literally or under the doctrine of equivalents.

What is claimed is:

1. A method to provide a platform-level network security framework comprising:
   identifying a packet associated with a processor system;
   identifying one or more platform-level network security protocols associated with an extensible firmware interface (EFI); and
   identifying the packet with a network security condition based on the one or more platform-level network security protocols,
   wherein identifying the one or more platform-level network security protocols associated with the EFI comprises identifying the one or more protocols of at least one configuration table associated with at least one of a firewall, a virtual private network, or an Internet Protocol Security framework.

2. A method as defined in claim 1, wherein identifying the packet associated with the processor system comprises identifying at least one of an incoming packet or an outgoing packet during at least one of a pre-boot environment or a post-boot environment.

3. A method as defined in claim 1, wherein identifying the one or more platform-level network security protocols associated with the EFI further comprises identifying the one or more platform-level network security protocols associated with the EFI based on a configuration table having one or more global unique identifiers and one or more data pointers.

4. A method as defined in claim 1, wherein identifying the packet with a network security condition based on the one or more platform-level network security protocols comprises associating the packet with at least one of an allowable condition and a deny condition based on the identified one or more protocols.

5. A method as defined in claim 1 further comprising transmitting the packet to a protocol stack in response to identifying the packet with an allowable condition based on the one or more platform-level network security protocols.

6. A method as defined in claim 1 further comprising discarding the packet in response to identifying the packet with a deny condition based on the one or more platform-level network security protocols.

7. An apparatus to provide a platform-level network security framework comprising:
   a network interface to communicate packets;
   an interrupt handler coupled to the network interface to receive an interrupt request (IRQ); and
   a network interface driver coupled to the interrupt handler to identify a packet associated with a processor system, to identify one or more platform-level network security protocols associated with an extensible firmware interface (EFI), and to identify the packet with a network security condition based on the one or more platform-level network security protocols,
   wherein the one or more platform-level network security protocols comprises one or more protocols of at least one configuration table associated with at least one of a firewall, a virtual private network, or an Internet Protocol Security framework.

8. An apparatus as defined in claim 7, wherein the network interface driver is to identify at least one of an incoming packet from the network interface or an outgoing packet from an operating system during at least one of a pre-boot environment or a post-boot environment.

9. An apparatus as defined in claim 7, wherein the network interface driver is to transmit the packet to a protocol stack in response to identifying the packet with an allowable condition based on the platform-level network security protocols.

10. An apparatus as defined in claim 7, wherein the network interface driver discards the packet in response to identifying the packet with a deny condition based on the one or more platform-level network security protocols.

11. An apparatus as defined in claim 7, further comprising a configuration table having one or more globally unique identifiers and one or more data pointers to identify the one or more the platform-level network security protocols.

12. A processor system to provide a platform-level network security framework comprising:
    a network interface to communicate packets; and
    a processor coupled to the network interface, the processor programmed to identify a packet associated with the processor system, to identify one or more platform-level network security protocols associated with an extensible firmware interface (EFI), and to identify the packet with a network security condition based on the one or more platform-level network security protocols,
    wherein the one or more platform-level network security protocols comprises one or more protocols of at least one configuration table associated with at least one of a firewall, a virtual private network, or an Internet Protocol Security framework.

13. A processor system as defined in claim 12, wherein the processor is programmed to identify at least one of an incoming packet from the network interface or an outgoing packet from an operating system during at least one of a pre-boot environment or a post-boot environment.

14. A processor system as defined in claim 12, wherein the processor is programmed to transmit the packet to a protocol stack in response to identifying packet with an allowable condition based on the platform-level network security protocols.

15. A processor system as defined in claim 12, wherein the processor is programmed to discard the packet in response to identifying the packet with a deny condition based on the one or more platform-level network security protocols.

16. A processor system as defined in claim 12, further comprising a configuration table having one or more globally unique identifiers and one or more data pointers to identify the one or more the platform-level network security protocols.

* * * * *